United States Patent [19]

Liu

[11] Patent Number: 5,827,005

[45] Date of Patent: *Oct. 27, 1998

[54] ELBOW JOINT ASSEMBLY

[76] Inventor: Yang-Ting Liu, No. 76-1, Lin 4, Shang-Kuan Li, Yuan Li Town, Miao Li Hsien, Taiwan

[ * ] Notice: The term of this patent shall not extend beyond the expiration date of Pat. No. 5,520,474.

[21] Appl. No.: 857,688

[22] Filed: May 19, 1997

[30] Foreign Application Priority Data

Feb. 18, 1997 [TW] Taiwan ................................ 86202558

[51] Int. Cl.⁶ ...................................................... B25G 3/18
[52] U.S. Cl. ...................... 403/322.1; 403/321; 403/103; 403/97; 16/308; 16/341
[58] Field of Search ................................... 403/321, 322, 403/103, 97, 94, 93, 84, 83; 16/341, 342, 308

[56] References Cited

U.S. PATENT DOCUMENTS

| | | | |
|---|---|---|---|
| 3,317,225 | 5/1967 | Cooper | 403/97 X |
| 4,582,445 | 4/1986 | Warshawsky | 403/97 |
| 4,614,452 | 9/1986 | Wang | 403/97 X |
| 5,039,118 | 8/1991 | Huang | 403/97 X |
| 5,314,500 | 5/1994 | Weddendorf | 623/57 |
| 5,377,368 | 1/1995 | Cheng | 403/97 X |
| 5,520,474 | 5/1996 | Liu | 403/97 |

*Primary Examiner*—Daniel P. Stodola
*Assistant Examiner*—Bruce A. Lev
*Attorney, Agent, or Firm*—Rosenberg, Klein & Bilker

[57] ABSTRACT

An elbow joint assembly including two elbow joints mounted on two opposite ends of a shaft around a screw rod, each elbow joint including a fixed elbow having a barrel raised from the periphery and fixed to a locating rod of a mechanism, two movable elbows turned about the shaft and having a respective barrel raised from the periphery and holding a respective rod, two constraint blocks mounted on the shaft and forced to hold down the movable elbows and the fixed elbow in between the movable elbows, two spring elements mounted around the shaft between the movable elbows and the constraint blocks to force them apart; and two levers respectively pivoted to the shaft and turned between a first position in which the constraint blocks are forced into engagement with the movable elbows, causing the movable elbows and the fixed elbow to be firmly retained in position, and a second position in which the constraint blocks are released from the movable elbows, for permitting the movable elbows to be respectively turned about the shaft to the desired angle.

4 Claims, 7 Drawing Sheets

ELBOW JOINT ASSEMBLY

BACKGROUND OF THE INVENTION

The present invention relates to an elbow joint assembly more particularly relates to a two dimensional adjustable elbow joint assembly which comprises a shaft and two elbow joints mounted on two opposite ends of the shaft, each elbow joint comprising a fixed elbow mounted on the shaft and prohibited from rotary motion relative to it and two movable elbows turned about the shaft relative to the fixed elbow in a plane perpendicular to the shaft and fixed at the desired angle by two constraint blocks by means of the control of two cam levers.

Elbow joints are intensively used in furniture and mechanical devices such as cloth racks, baby carts, sunshades, chairs, antenna stands, etc., for permitting parts of devices to be adjusted to different angles. Regular elbow joints are commonly complicated in structure, and comprised of a big number of parts, therefore they are expensive to manufacture and inconvenient to operate.

SUMMARY OF THE INVENTION

It is one object of the present invention to provide an elbow joint assembly which is simple in structure and inexpensive to manufacture. It is another object of the present invention to provide an elbow joint assembly which is easy to operate. To achieve these and other objects of the present invention, an elbow joint assembly is provided comprised of a hollow shaft, a screw rod inserted through the shaft, two cap nuts respectively threaded onto the screw rods outside the shaft, two elbow joints retained on a shaft at two opposite ends around the shaft and separated by two sets of stop rods, which are respectively connected to a locating block and a holding-down bolt in a holding-down nut at two opposite sides in parallel to the shaft. Each elbow joint comprises a fixed elbow having a barrel raised from the periphery and fixed to a locating rod of a mechanism, two movable elbows turned about the shaft and having a respective barrel raised from the periphery and holding a respective rod, two constraint blocks mounted on the shaft and forced to hold down the movable elbows and the fixed elbow in between the movable elbows, two spring elements mounted around the shaft between the movable elbows and the constraint blocks to force them apart; and two levers respectively pivoted to the shaft and turned between a first position in which the constraint blocks are forced into engagement with the movable elbows, causing the movable elbows and the fixed elbow to be firmly retained in position, and a second position in which the constraint blocks are released from the movable elbows, for permitting the movable elbows to be respectively turned about the shaft to the desired angle.

DETAILED DESCRIPTION OF THE PREFERRED EMBODIMENT

Figure 1:
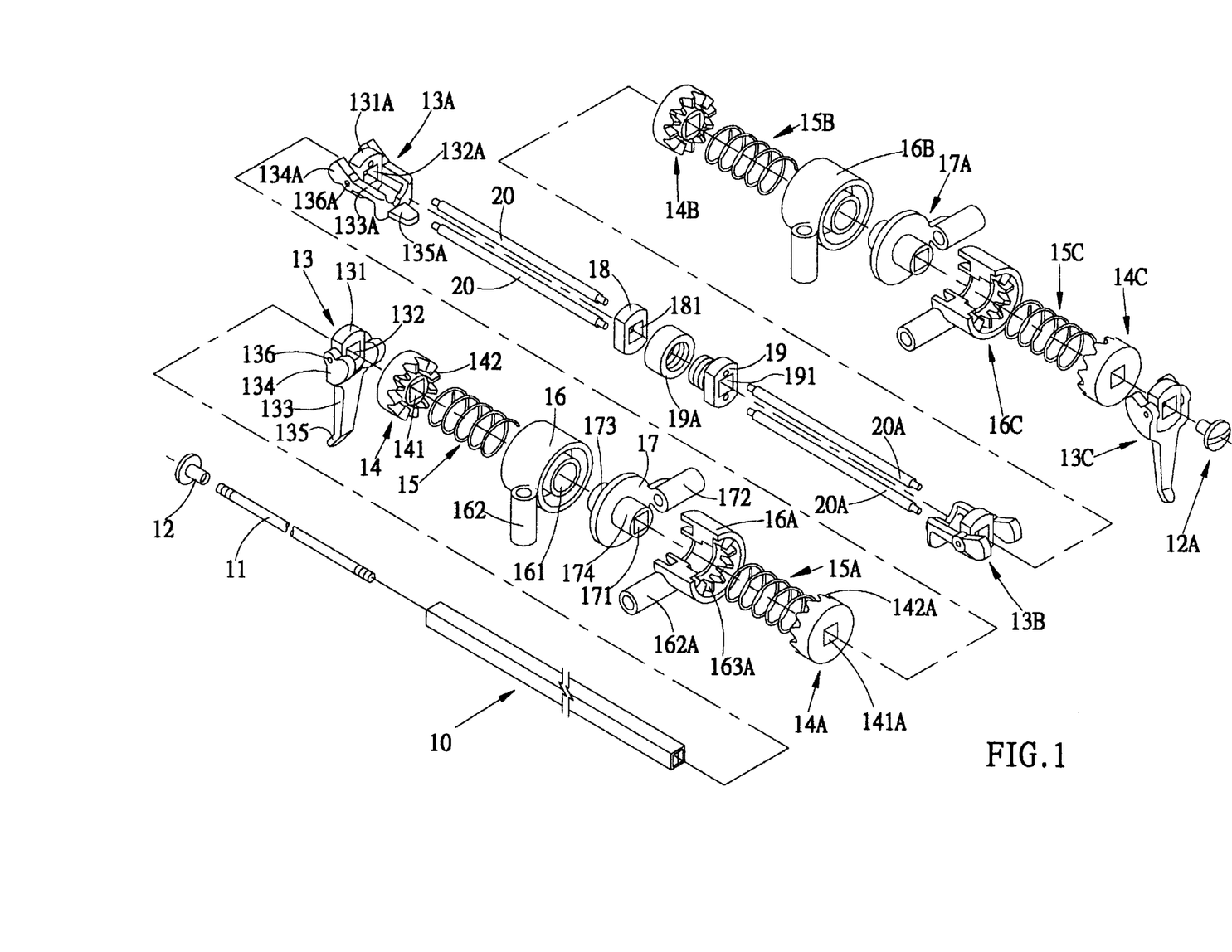
FIG. 1 is an exploded view of an elbow joint assembly according to the present invention.
Figure 1A:
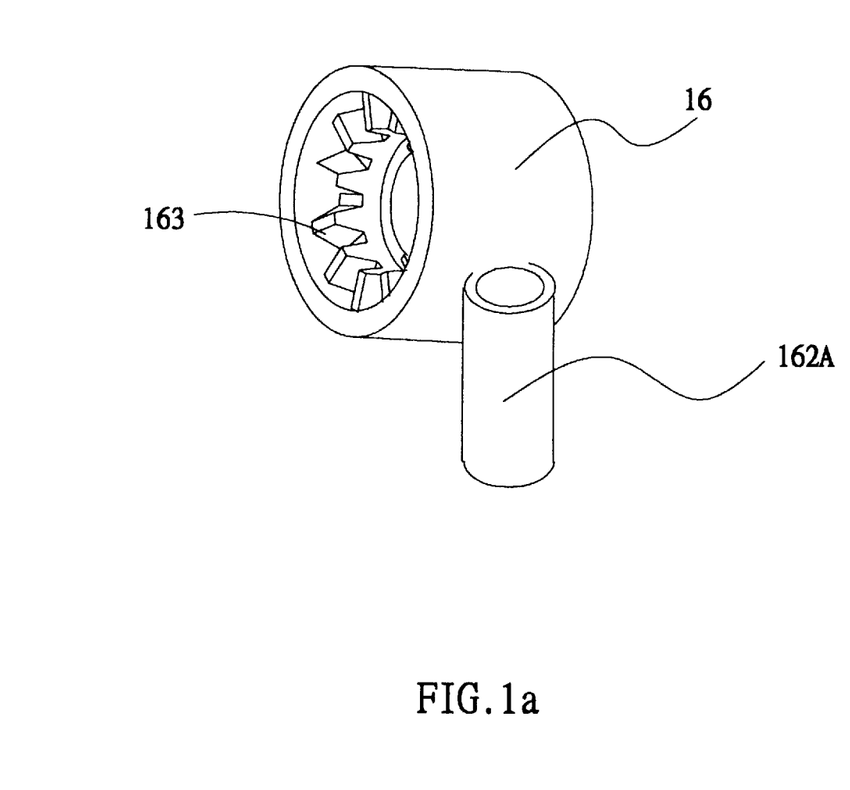
FIG. 1a is an enlarged view of the first movable elbow of the present invention.
Figure 2:
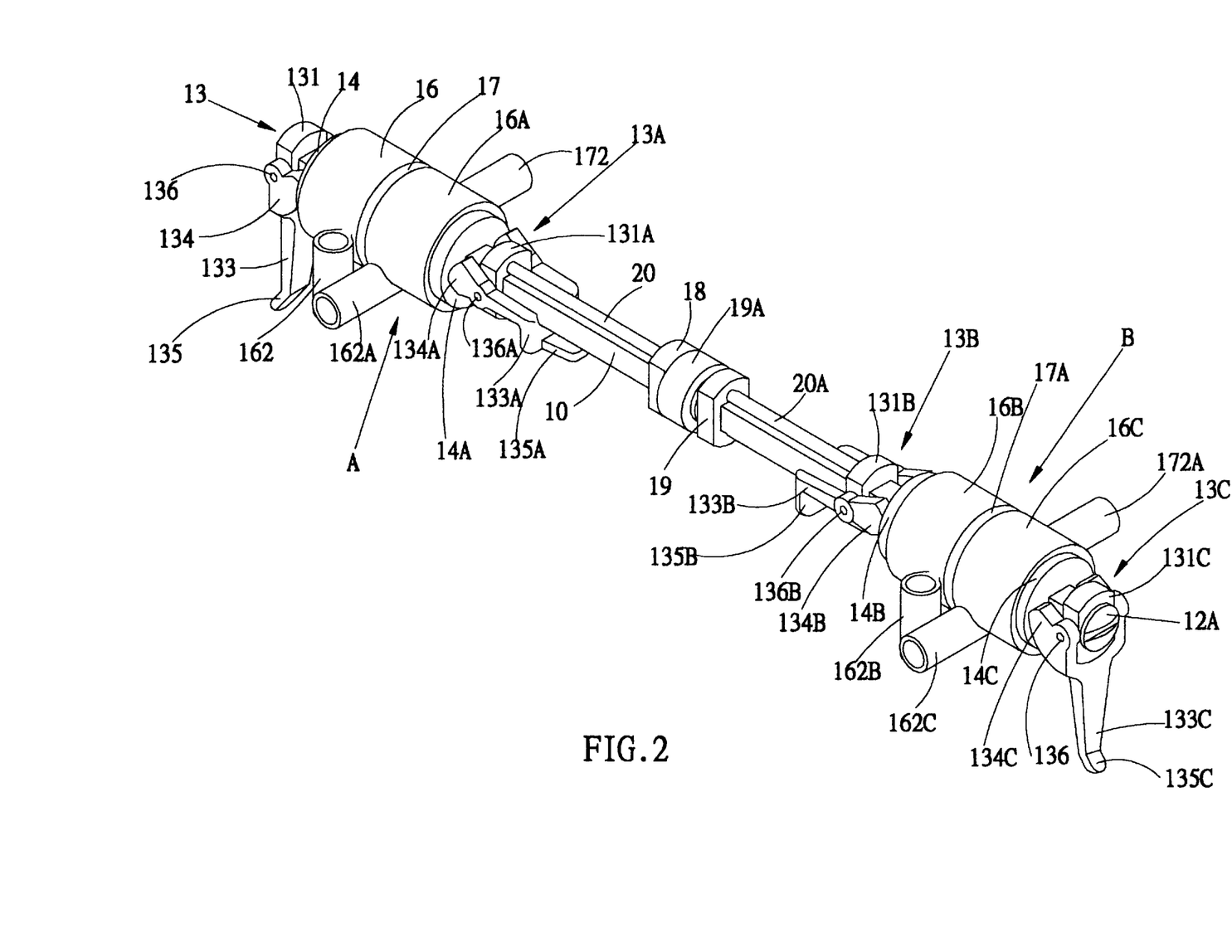
FIG. 2 is an elevational view of the elbow joint assembly shown in FIG. 1.

Referring to FIGS. 1, 1a and 2, an elbow joint assembly in accordance with the present invention is generally comprised of a hollow, polygonal shaft 10, a screw rod 11 inserted into the shaft 10, a first cap nut 12 and a second cap nut 12A respectively threaded onto two opposite ends of the screw rod 11 outside the shaft 10, a locating block 18 mounted around the shaft 10 and having a polygonal center through hole 181 which receives the shaft 10 in such a manner that the locating block 18 is allowed to be moved axially along the shaft 10 but prohibited from rotary motion relative to the shaft 10, a hollow holding-down bolt 19 mounted around the shaft 10 and having a polygonal center through hole 191 which receives the shaft 10 in such a manner that the holding-down bolt 19 is allowed to be moved axially along the shaft 10 but prohibited from rotary motion relative to the shaft 10, a holding-down nut 19A, a holding-down nut 19A threaded onto the holding-down bolt 19 and stopped at one side of the locating block 18, a plurality of first stop rods 20 respectively connected to the locating block 18 and disposed in parallel to the shaft 10, a plurality of second stop rods 20A respectively connected to the holding-down bolt 19 and disposed in parallel to the shaft 10 and in longitudinal alignment with the fist stop rods 20, a first elbow joint A mounted around the shaft 10 and stopped between the first stop rods 20 and the first cap nut 12, and a second elbow joint B mounted around the shaft 10 and stopped between the second stop rods 20A and the second cap nut 12A.

The first elbow joint A comprises a first cam lever 13, a second cam lever 13A, a first constraint block 14, a second constraint block 14A, a first spring element 15, a second spring element 1SA, a first movable elbow 16, a second movable elbow 16A, and a fixed elbow 17. The fixed elbow 17 is mounted around the shaft 10 and retained between the first movable elbow 16 and the second movable elbow 16A, having a polygonal center through hole 171 which receives the shaft 10 in such a manner that the fixed elbow 17 is allowed to be moved axially along the shaft 10 but prohibited from rotary motion relative to the shaft 10, a first extension tube 173 and a second extension tube 174 respectively raised from two opposite ends around the polygonal center through hole 171, and a locating barrel 172 raised from the periphery and adapted for securing to a locating rod of a mechanism, The first movable elbow 16 and the second movable elbow 16A are respectively mounted on the first extension tube 173 and second extension tube 174 of the fixed elbow 17 around the shaft 10, having a respective circular center through hole 161 or 161A which receives the extension tube 173 or 174 in such a manner that the movable elbow 16 or 16A is allowed to be moved axially along the extension tube 173 or 174 and turned about it, a respective barrel 162 or 162A extended from the periphery for holding a rod, permitting the rod to be turned with the movable elbow 16 or 16A in a plane perpendicular to the shaft, and a toothed portion 163 or 163A at an outer side. The first spring element 15 and the second spring element 1SA are respectively mounted around the shaft 10 and retained between the movable elbows 16;16A and the constraint blocks 14;14A to force them apart. The first constraint block 14 and the second constraint block 14A are respectively mounted around the shaft 10 and forced by the first cam lever 13 and the second cam lever 13A into engagement with the first movable elbow 16 and the second movable elbow 16A, having each a polygonal center through hole 141 or 141A which receives the shaft 10 in such a manner that the constraint block 14 or 14A is allowed to be moved axially along the shaft 10 but prohibited from rotary motion relative to the shaft 10, and a toothed portion 142 or 142A at an inner side forced into engagement with the toothed portion 163 or 163A of the movable elbow 16 or 16A. The first lever 13 and the second lever 13A are respectively mounted around the shaft 10 and controlled to force the constraint blocks 14;14A into engagement with the movable elbows 16;16A, causing the fixed elbow 17 to be firmly retained in between the movable elbows 16;16A. Each cam lever 13 or 13A comprises a head 131 or 131A defining a polygonal center through hole 132 or 132A which receives the shaft 10 in such a manner that the cam lever 13 or 13A is allowed to be moved axially along the shaft 10 but prohibited from rotary motion relative to the shaft 10, a hand grip 133 or 133A extended from the head 131 or 131A, and two cams 134 or 134A bilaterally raised from the head 131 or 131A and stopped at the constraint block 14 or 14A. Same as the first elbow joint A, the second elbow B is comprised of a first cam lever 13B, a second cam lever 13C, a first constraint block 14B, a second constraint block 14C, a first spring element 15B, a second spring element 15C, a first movable elbow 16B, a second movable elbow 16C, and a fixed elbow 17A. As the structure of the second elbow joint B is identical to the first elbow joint A, it is not described further. The mounting procedure of the second elbow joint B is also same as that of the first elbow joint A.

Figure 3A:
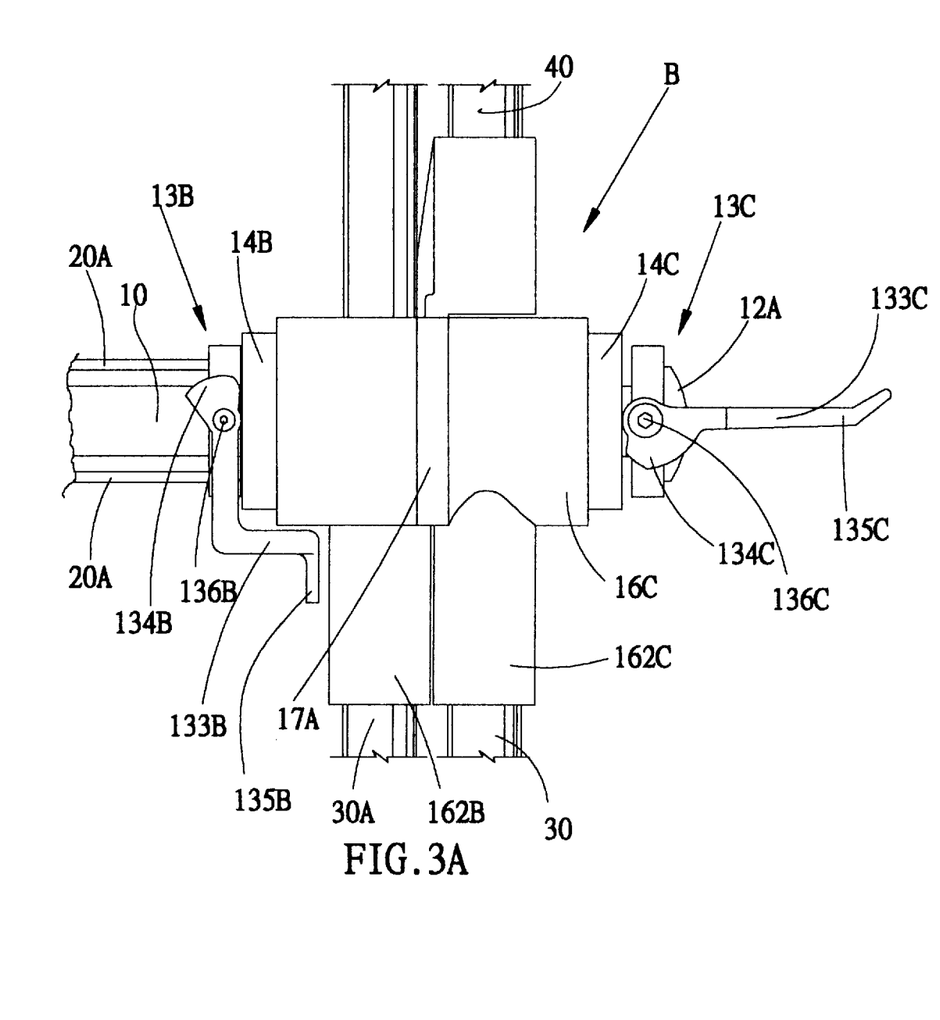
FIG. 3A is a side view of one elbow joint of the elbow joint assembly shown in FIG. 2, showing the movable elbows released from the constraint blocks.
Figure 3B:
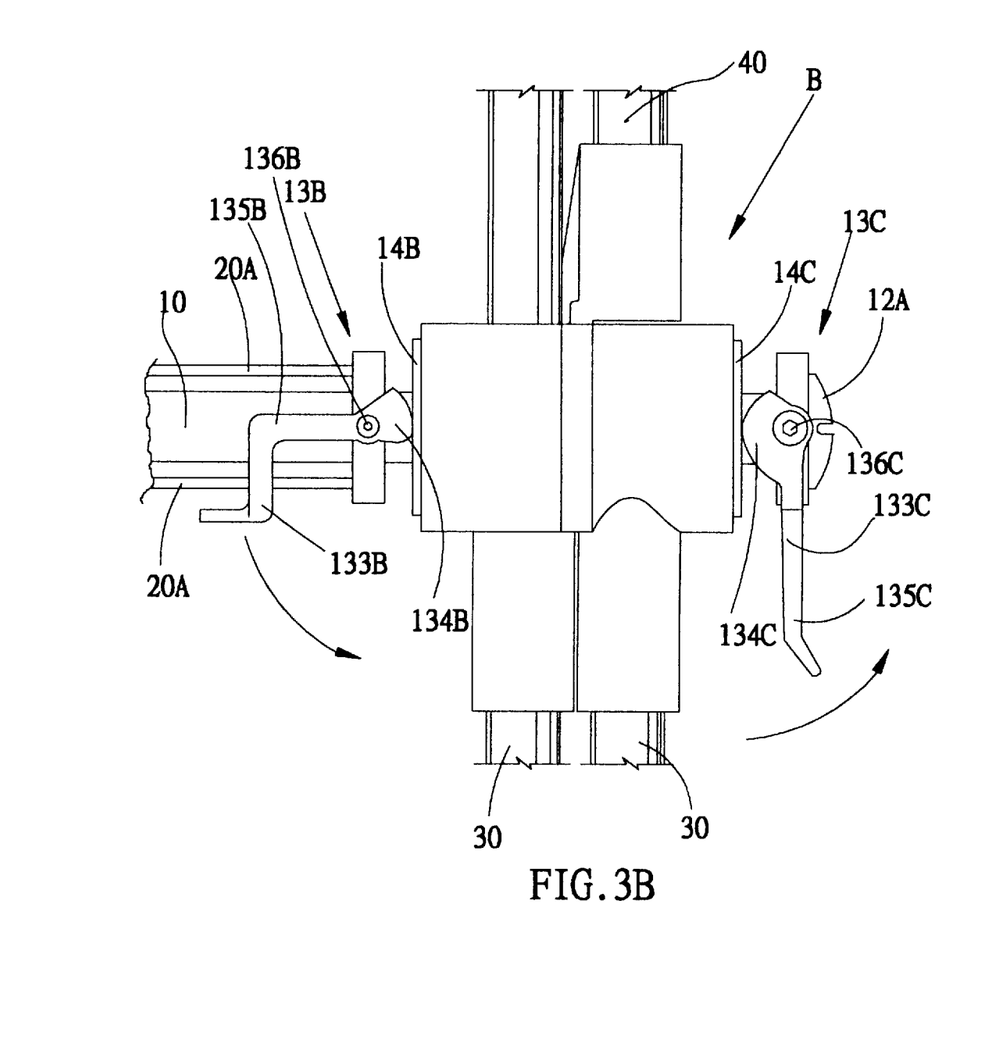
FIG. 3B is similar to FIG. 3A but showing the movable elbows and the constraint blocks engaged together.
Figure 3C:
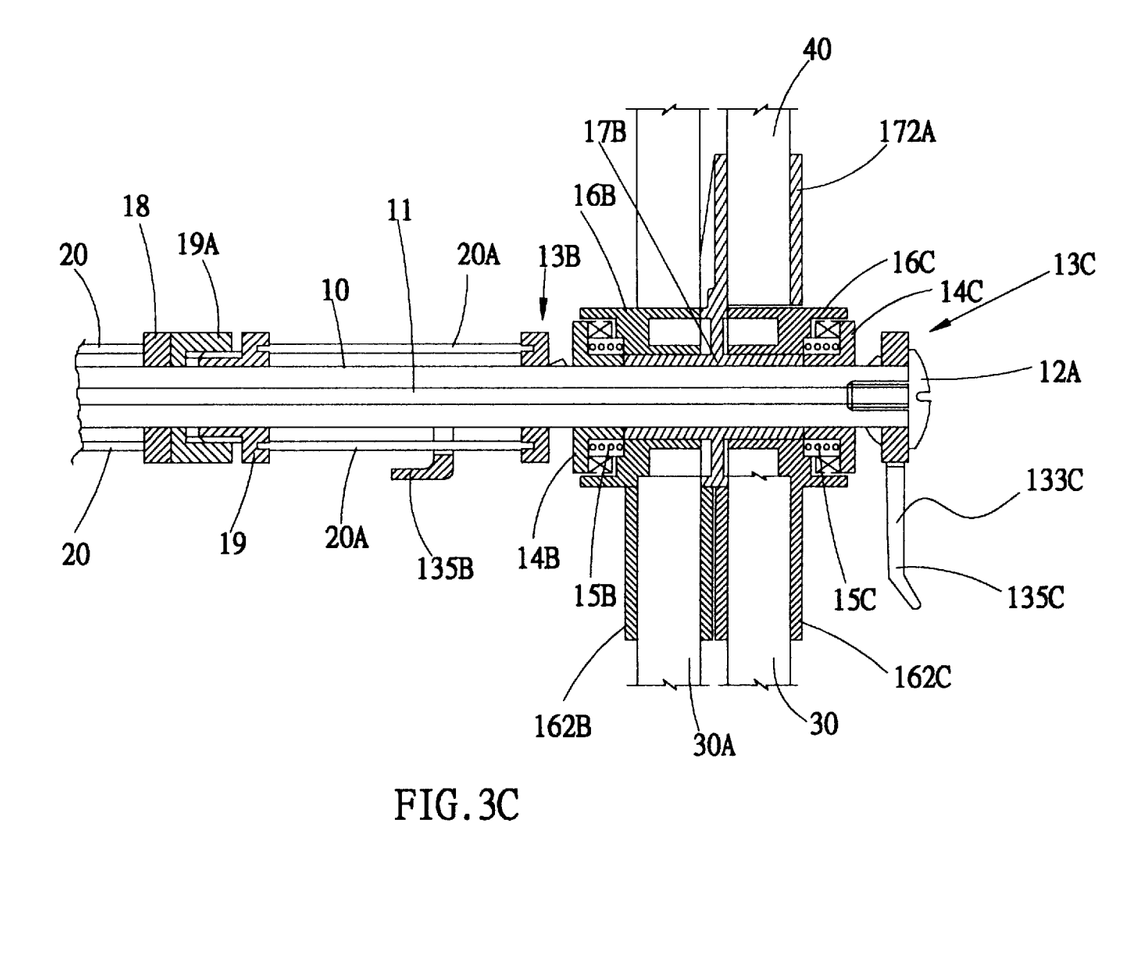
FIG. 3C is a sectional view of FIG. 3B.

FIGS. 3A and 3B are side views of the second elbow joint B, and FIG. 3C is a sectional view of FIG. 3B. The locating barrel 172A of the fixed elbow 17A is secured to a support rod 4, the barrels 162B;162C of the movable elbows 16B;16C are secured to rods 30A;30. When the levers 13B;13C are released from the constraint blocks 14B;14C as shown in FIG. 3A, the constraint blocks 14B;14C are forced outwards by the spring elements 15B;15C and disengaged from the movable elbows 16B;16C, and therefore the movable elbows 16B;16C are allowed to be respectively turned about the shaft 10 relative to the fixed elbow 17A to change the angular positions of the rods 30A;30. When adjusted, the cam levers 13B;13C are turned from the position shown in FIG. 3A to the position shown in FIG. 3B, the constraint blocks 14B;14C are respectively forced inwards by the cams 134B;134C into engagement with the movable elbows 16B;16C again, and therefore the rods 30A;30 are respectively retained in the adjusted positions.

Figure 4:
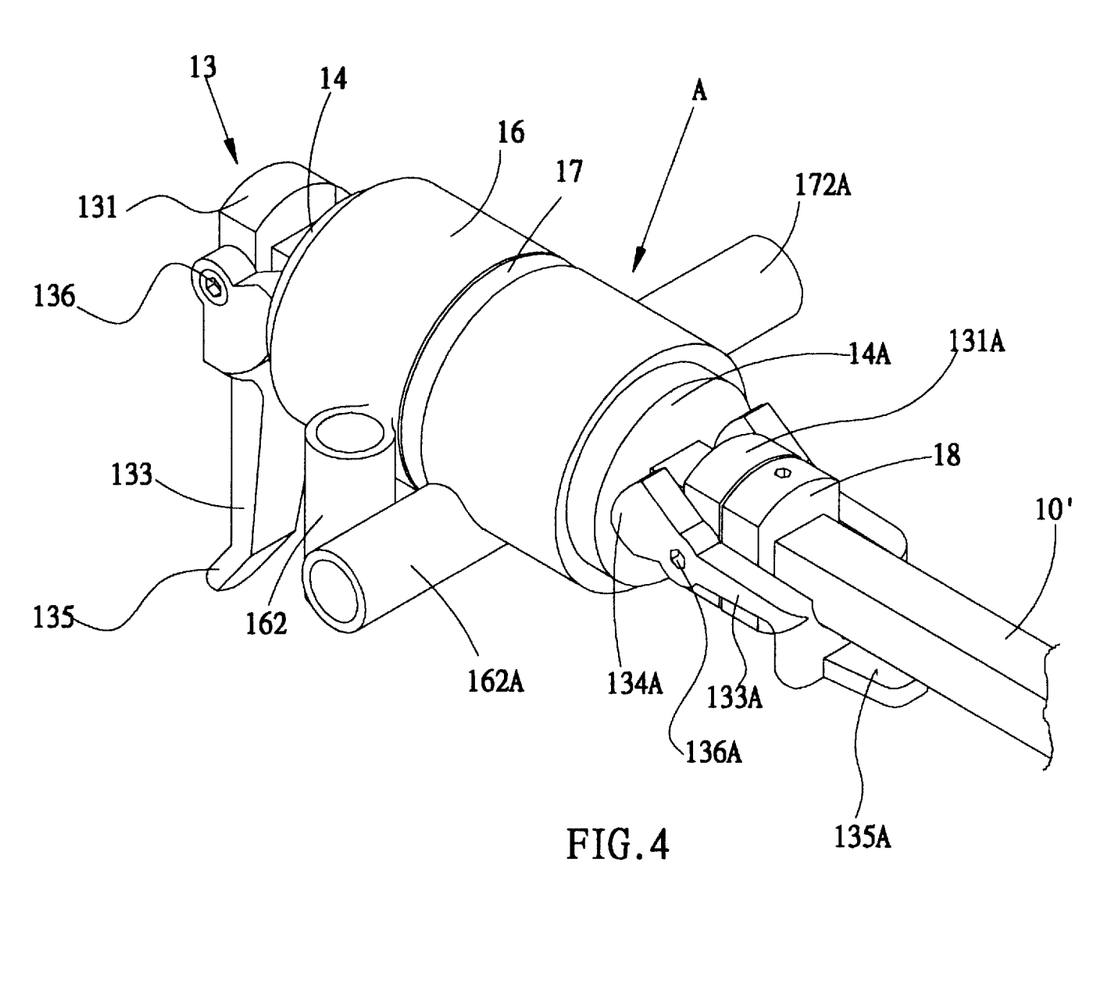
FIG. 4 is an elevational view of an elbow joint assembly according to an alternate form of the present invention.

FIG. 4 shows an alternate form of the present invention, in which the locating block 18 is fixedly secured to the shaft 10' by for example a tightening up screw, to fix the elbow joint A in place.

It is to be understood that the drawings are designed for purposes of illustration only, and are not intended as a definition of the limits and scope of the invention disclosed.

What the invention claimed is:

1. An elbow joint assembly comprising a polygonal hollow shaft having a screw rod throughly inserted therein, two cap nuts fixedly mounted on two opposite ends of said shaft, an elbow joint mounted on said shaft and moved between said locating blocks, said elbow joint comprising:

a fixed elbow mounted around and moved axially along said shaft and prohibited from rotary motion relative to said shaft, said fixed elbow comprising two extension tubes raised from two opposite sides thereof and respectively sleeved onto said shaft, and a locating barrel raised from the periphery perpendicular to said shaft and adapted for securing to a locating rod of a mechanism;

two movable elbows respectively mounted around the extension tubes of said fixed elbow and turned about them, each of said movable elbows having a respective barrel raised from the periphery perpendicular to said shaft and adapted for holding a respective rod, and a respective toothed portion at an outer side;

two constraint blocks respectively mount around and moved axially along said shaft and prohibited from rotary motion relative to said shaft, said constraint blocks having a respective toothed portion at an inner side respectively forced into engagement with the toothed portions of said movable elbows;

two spring elements respectively mounted around said shaft and retained between said movable elbows and said constraint blocks to force them apart; and two cam levers respectively mounted on said shaft and stopped between said constraint blocks and said locating blocks, and turned between a first position in which said constraint blocks are forced into engagement with said movable elbows, causing said movable elbows and said fixed elbow to be firmly retained in position, and a second position in which said constraint blocks are released from said movable elbows, for permitting said movable elbows to be respectively turned about said shaft to a desired angle.

2. The elbow joint assembly of claim 1 wherein each of said cam levers comprises a head defining a polygonal center through hole which receives said shaft, a hand grip extended from said head for turning by hand, and two cams bilaterally raised from said head and stopped at the corresponding constraint block and turned with the respective lever to move the respective constraint block into engagement with the corresponding movable elbow.

3. An elbow joint assembly comprising:

a hollow shaft;

a screw rod inserted through said hollow shaft;

a first cap nut and a second cap nut respectively threaded onto two opposite ends of said screw rod outside the shaft;

a locating block mounted around said shaft and allowed to be moved axially along said shaft but prohibited from rotary motion relative to it;

a hollow holding-down bolt mounted around said shaft and allowed to be moved axially along said shaft but prohibited from rotary motion relative to it;

a holding-down nut threaded onto said holding-down bolt and stopped at one side of said locating block;

a plurality of first stop rods respectively connected to said locating block and disposed in parallel to said shaft;

a plurality of second stop rods respectively connected to said holding-down bolt and disposed in parallel to said shaft and in longitudinal alignment with said fist stop rods;

a first elbow joint mounted around said shaft and stopped between said first stop rods and said first cap nut; and a second elbow joint mounted around said shaft and stopped between said second stop rods and said second cap nut;

wherein each of said first elbow joint and said second elbow joint comprises:

a fixed elbow mounted around and moved axially along said shaft and prohibited from rotary motion relative to said shaft, said fixed elbow comprising two extension tubes raised from two opposite sides thereof and respectively sleeved onto said shaft, and a locating barrel raised from the periphery and adapted for securing to a locating rod of a mechanism;

two movable elbows respectively mounted around the extension tubes of said fixed elbow and turned about them, each of said movable elbows having a respective barrel raised from the periphery and adapted for holding a respective rod, and a respective toothed portion at an outer side;

two constraint blocks respectively mount around and moved axially along said shaft and prohibited from rotary motion relative to said shaft, said constraint blocks having a respective toothed portion at an inner side respectively forced into engagement with the toothed portions of said movable elbows;

two spring elements respectively mounted around said shaft and retained between said movable elbows and said constraint blocks to force them apart; and two cam levers respectively pivoted to said shaft and stopped at said constraint blocks at an outer side, and turned between a first position in which said constraint blocks are forced into engagement with said movable elbows, causing said movable elbows and said fixed elbow to be firmly retained in position, and a second position in which said constraint blocks are release from said movable elbows, for permitting said movable elbows to be respectively turned about said shaft to a desired angle in a plane perpendicular to said shaft.

4. The elbow joint assembly of claim 3 wherein each of said cam levers comprises a head defining a polygonal center through hole which receives said shaft, a hand grip extended from said head for turning by hand, and two cams bilaterally raised from said head and stopped at the corresponding constraint block and turned with the respective lever to move the respective constraint block into engagement with the corresponding movable elbow.

\* \* \* \* \*